Figure 1:
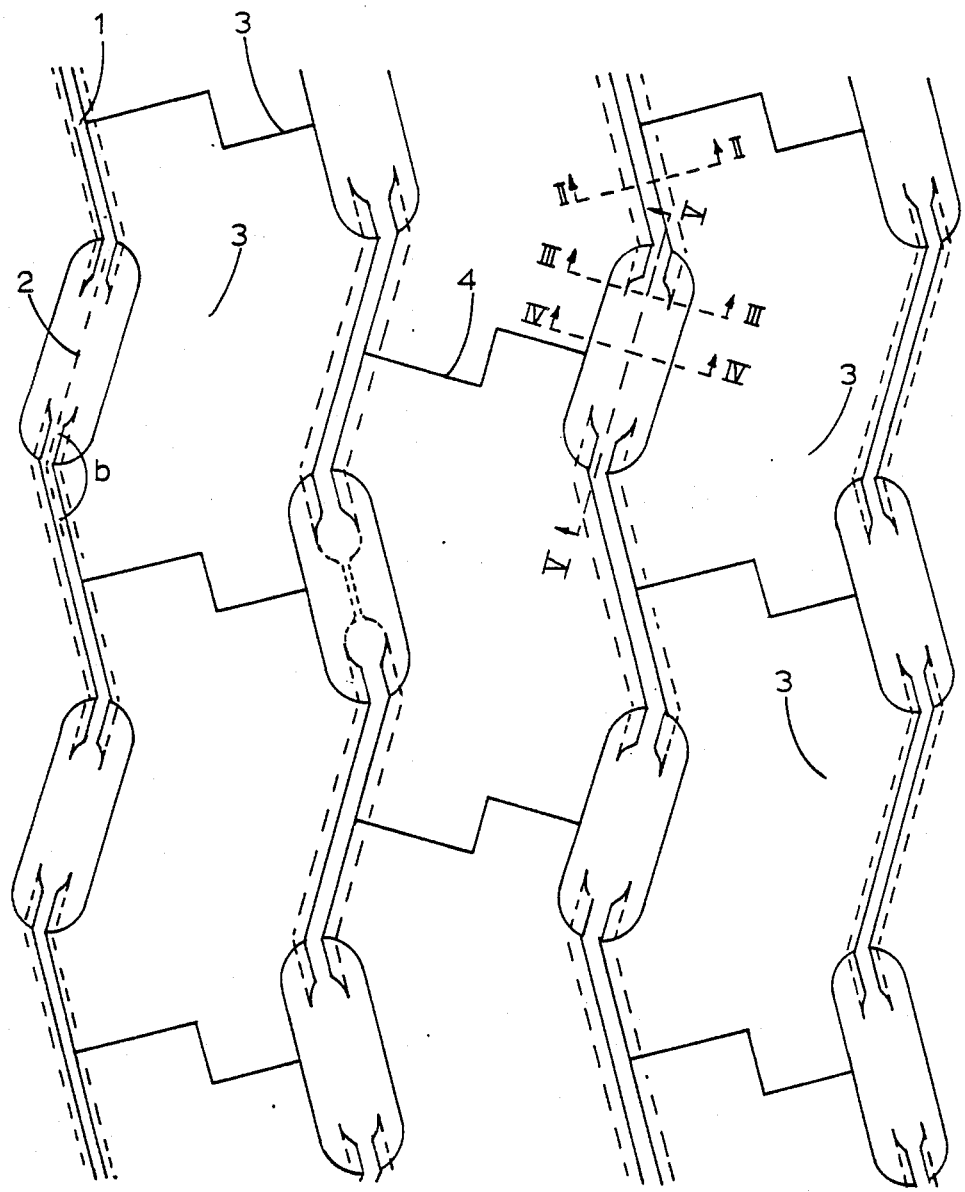

United States Patent [19]

Ghilardi

[11] Patent Number: 4,703,787

[45] Date of Patent: Nov. 3, 1987

[54] TIRES HAVING A LOW ABSORPTION OF ROLLING RESISTANCE FOR VEHICLE WHEELS

[75] Inventor: Giuliano Ghilardi, Milan, Italy

[73] Assignee: Pirelli Coordinamento Pneumatici S.p.A., Italy

[21] Appl. No.: 871,325

[22] Filed: Jun. 6, 1986

[30] Foreign Application Priority Data

Jun. 26, 1985 [IT] Italy .................. 21303 A/85

[51] Int. Cl.⁴ .............................. B60C 11/06
[52] U.S. Cl. ................................. 152/209 R
[58] Field of Search ........ 152/209 R, 209 D, DIG. 3, 152/153

[56] References Cited

U.S. PATENT DOCUMENTS

| 2,322,505 | 6/1943 | Bull | 152/209 R |
| 3,559,711 | 2/1971 | Schelkmann | 152/209 R |
| 3,674,076 | 7/1972 | Dailey | 152/209 R |
| 4,462,446 | 7/1984 | Goergen et al. | 152/209 R |
| 4,484,610 | 11/1984 | Wallet et al. | 152/209 R |

FOREIGN PATENT DOCUMENTS 0136502  8/1983  Japan .................. 152/209 R

Primary Examiner—Michael Ball
Attorney, Agent, or Firm—Stevens, Davis, Miller & Mosher

[57] ABSTRACT

The tread-pattern presents a plurality of circumferential zig-zag grooves that divide the tread-band into a plurality of ribs, and a series of sipes which divide at least the axially inner ribs, into a plurality of blocks that are reciprocally locked, one with respect to the other, in the transversal direction.

The above-said grooves, are comprised by an alternated succession of narrow notches and large elliptical shaped cavities, with the greater axis constituting one side of the zig-zag, with having the cross-section, the slant of the sidewalls and the base-profile, variable with continuity.

10 Claims, 6 Drawing Figures

TIRES HAVING A LOW ABSORPTION OF ROLLING RESISTANCE FOR VEHICLE WHEELS

DESCRIPTION

The present invention concerns tires for vehicle wheels, and in particular truck tires, having a medium and high load capacity, that are destined for transporting goods and persons over long distances, and at high speeds.

In this type of tire, the important of all the tire behaviour characteristics is the rolling-resistance. In fact, the said rolling-resistance absorbs a certain part of the energy provided to the tire and, as a consequence, this requires a corresponding fuel consumption.

Moreover, this energy, that is absorbed by the tire, translates into a corresponding quantity of heat to be dissipated, which cuases a rise in the tire's temperature, with resulting in having a detrimental effect upon the service-life of the tire.

Especially in consideration of the type of exercise for which the tires are destined (long routes at high speeds), it is quite clear that a lessening in the rolling-resistance brings about considerable advantages both, as regards the fuel consumption, as well as regarding the fatigue resistance of the tire di per se.

Unfortunately, the provisions that give rise to a decrease in the rolling-resistance, also act negatively on the other essential characteristics for having good tire behaviour so much so, that they generically cannot be adopted.

In particular, the decrease in the rolling-resistance can be attained either by rendering the tread-band more massive, or by reducing the value of the empty/full ratio. But these provisions worsen the tire behaviour in the face of the aquaplane phenomenon. Moreover, any attempt to restore the good tire behaviour during the aquaplane phenomenon, by having a plurality of large cavities distributed in a discontinuous manner on the tread-band, even if connected to one another, gives rise to the noise phenomenon and to a loss of riding-comfort, with increasing the rolling-resistance owing to the deformability by bending and the squeezing of the blocks that subdivide the tread-band, with also involving serious damages occurring to the treadband whenever foreign bodies enter and are not successively expelled from the above-said cavities.

To end with, on the borders of the above-said cavities or anyway, of the diverse grooves made on the tread-band, the phenomenon of an early and irregular wearing-out of the tire are easily primed, owing to the pressure discontinuity and hence, of the wearing-out process, for a given entity of rubbing away, during the rolling.

The Applicant has now discovered a way to realize a tread-pattern according to the above-said criteria, with simultaneously eliminating any side effects so much so that, the aim of the present patent is a tread-band having a low rolling-resistance and which nevertheless, does not have any lesser general behaviour characteristics as compared to the usual 'known' tires; it has been verified rather, that the performances of the tire of the invention, tends to be better as compared to that of normal tires.

Therefore, what forms the object of this patent, is a tire for vehicle wheels which comprises a radial carcass, a tread-band disposed in the crown zone of said carcass and a belt-structure inserted in-between carcass and tread-band, said tread-band being provided with a pattern comprised by a plurality of circumferential zig-zag grooves comprising, at the surface of the tread-band, an alternated succession of narrow notches and large cavities, of a substantially elliptical form, with the greater axis that is disposed in a substantially longitudinal direction, connected at each extremity, with the axis of the adjacent notch, with the notches belonging to two grooves disposed side-by-side, being circumferentially spaced apart from one another, characterized by the fact that at least the axially inner ribs, generated by said plurality of grooves, are further subdivided into blocks by a series of tranversal sipes, which connect each cavity with an adjacent notch, and that said cavities have a continuously variable base-profile, and that the radially lower portion of the said notches extend till the sides of said cavities in such a way as to determine the said variation of the base-profile.

In a preferred form of embodiment for the tire of the invention, the above-said transversal sipes have a zig-zag lay-out fof thus creating a joint between two successive blocks with respect to the transversal shiftings. Moreover, the notch in-between contiguous cavities, has the same (maximum) depth as the cavities themselves.

The notches have a drop-shaped cross-section, i.e. comprising a radially outer portion, with substantially radial sides, of a constant width, and a radially inner portion wider than the outer portion, having a substantially ovoidal form, drop-shaped, U-shaped, and suchlike; while the radial height of the radially outer portion is at least equal to 35% of the total depth of the notch and preferably the said cavities have sides that slant, at an angle comprised between 15° and 40° measured at the edge of the cavity.

In any case, the present invention will be better understood with the aid of the following description and the attached figures, provided solely by way on non-limiting example, whereby:

BRIEF DESCRIPTION OF THE DRAWINGS FIG. 1—illustrates a limited circumferential portion of the tread-pattern, according to the invention.

FIGS. 2, 3, 4, 5, likewise illustrate right-angled sections, relative to a circumferential groove, according to four distinct planes.

Figure 6:
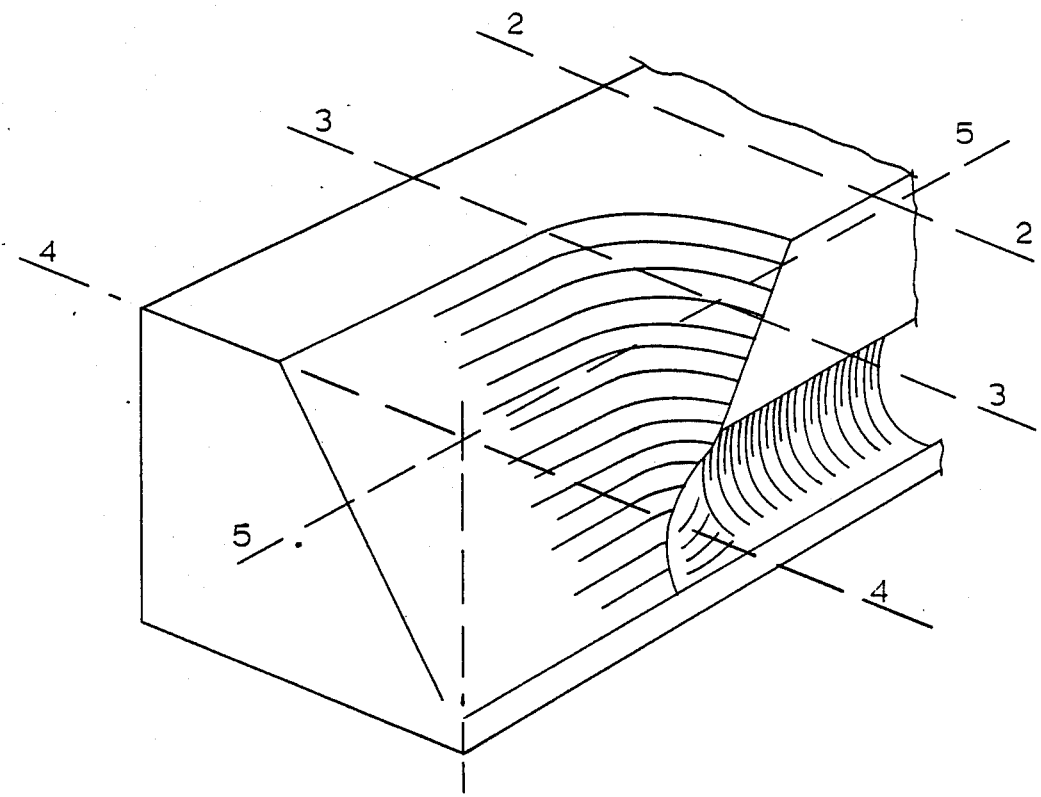

FIG. 6—illustrates a limited portion of one of the cavities, seen in a perspective view.

Hence, with reference to FIG. 1, the tread comprises a plurality of circumferential zig-zag grooves that are formed by an alternated succession of narrow notches 1 and large cavities 2.

At the surface of the tread-band, the form of said cavities is elliptical with the greater axis, that is disposed in the substantially circumferential sense, joined at each extremity to the adjacent notch's axis.

The adjacent grooves are reciprocally ahead by one step so much so that, even in the direction transversal to the tread, notches and cavities alternate one with the other for thus having a uniform stiffening of the tread under the ground-contact area. Moreover, the circumferential grooves are preferably equal in number for so maintaining constant the number of notches and transversally adjacent cavities, along the entire circumferential development of the tire, and hence, even the total surface of the tread-band that rotates alternatively under the ground-contact area of the tire, during exercise.

This said characteristic allows for having an optimization in the distribution of the ground-contact pressures, the realization of large blocks subjected to a constant pressure and also a uniform distribution of the cavities destined to receive the water which is present on the ground.

The angle of the zig-zag, i.e. the concave angle b contained between the axis of the cavity and the axis of the adjacent notch, is comprised between 90° and 180° (165° in the version illustrated in the figure), and it can also vary by passing from one groove to the other, or along the circumferential development of the same groove however, always within the above established limits.

At the surface, the width of the notches is the minimum, for so being compatible with the need to remove the tire from the vulcanizing-mould, and hence, it depends upon the transversal dimension of the drop-form, that is necessary for conducting the water: by way of orientation it could be from about 25% to 60% of said transversal dimension; whereas, the width of the cavities is preferably not less than the width of the drop-form. Even in this instance, said widths can vary by passing from one groove to the next, since said notches, under the ground-contact area, must preferably shut in the two lateral grooves, while always staying open in the central grooves.

All the above-said measurements are intended as taken on a tire carcase that is not mounted on the rim.

The above-said grooves divide the tread-band into a corresponding plurality of circumferential ribs. Amongst these, at least the axially inner ribs are preferably subsidived into a plurality of blocks 3 by means of a series of narrow sipes 4 which are developed between each cavity and the corresponding axially facing notch. Preferably, each cavity is connected with a single notch, and all the cavities of one groove are connected only with the corresponding notches of the same said facing groove.

Preferably, even the above-said sipes must have a zig-zag lay-out in such a way as to realize an interference and hence, a blocking in the transversal direction, between two successive blocks.

The width of said sipes does not exceed 2 mm in value, and their depth is preferably equal to that of the cavity, but not less than 30% of said depth.

Figure 2:
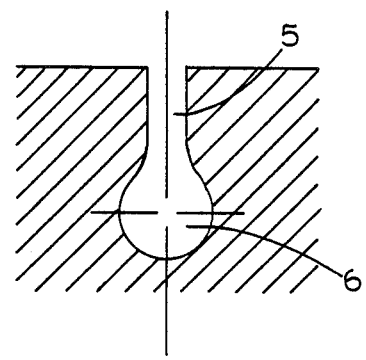

Coming now to considering the cross-section of the groove according to the invention, FIG. 1 shows the position of the planes II, III, IV and V, according to which the sections shown in FIGS. 2. 3. 4 and 5 are made.

FIG. 2 illustrates the cross-section of the notch, that is maintained always equal for the entire longitudinal lay-out of the notch itself; this section is of the tye generically defined as being of a "drop-shape", i.e. it is comprised by an external portion 5 with substantially radial sides, having a constant width throughout its entire depth, and by a radially inner portion 6 that is larger than the radially outer portion, with having a precisely a drop-like shape, i.e. circular, oval, U-shaped, and some other suchlike configurations.

The development of the two radial portions, is preferably exactly the same, i.e. equal to 50% of the total depth of the notch but, in any case, the radial development of the radially outer portion should always be more than 35% of the above-said total depth.

The purpose of this section is to allow for the flow of the water that enters into the tread-grooves and which is pushed in the circumferential direction, along the drop-shaped channel of the notch, even when the radially outer portion of the notch which moves through the ground-contact area, sensibly tightens, till completely shutting, with thus obstaculating any whatsoever flow in the radial sense.

Passing on to examining the cross-section of the cavity this instead, is much more complex, so that it will be described with the help of three distinct cross-sections, in correspondence of three diverse planes, and of a perspective view of the entire whole.

Therefore, said cavity presents a concave shape, having a continuously variable base profile as is shown with a broken-line in FIG. 1.

Therefore, said cavity presents a substantially concave form, with its sides inclined along the entire outline of the variable width at the base of the cavity, lesser at the centre and greater at the extremities, where the drop-shaped portions of the notches debouch into said cavity.

Figure 4:
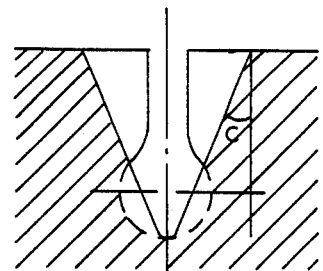

FIG. 4 illustrates the cross-section of the cavity in correspondence of the plane IV—IV of the mid-plane, perpendicular to the greater axis. It can be noted that the same is a V-section, symmetrical with respect to the meridian plane, having its sides inclined at an angle c equal to 25°. As an alternative, the value of the angle can also vary, by passing from one side to the other, with however staying within the range of between 25° and 40°, but in this case, the sum-total of the two angles must not exceed the higher critical value (80°) established for the symmetrical notch.

Figure 3:
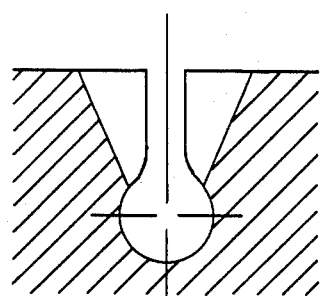

Now, passing on to FIG. 3, this illustrates the cross-section of the cavity along the plane III—III perpendicular to the greater axis in correspondence of the zone where the drop-shaped portion of the notch opens out on the cavity side.

The section is again of the symmetrical type, but the inclination of the sides is modified and so also the width. In actual fact, it has now passed from a V-section to a funnel-shaped section, with thus taking the width of the cavity-base, for giving it the same value as that of the drop-shaped portion of the notch.

Naturally, this modification in the profile of the lower portion of the cavity's sides takes place gradually, through curvilinear joining surfaces, in such a way as not to originate corners or points or anyway, zones of discontinuity on the surface of the sides and of the cavity-base that could prime off the phenomenon of disturbance, and thus obstaculate the regular flow of the water.

Figure 5:
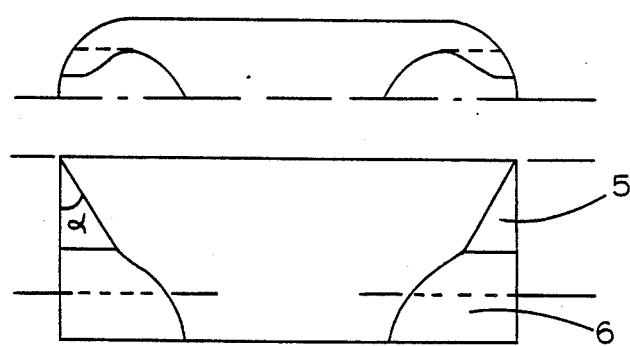

Moreover, FIG. 5, illustrates the cross-section of the cavity, on the through-plane passing through the axis of the same, transferred to its base profile.

First of all, the cavity's profile must be noted in the extremity zones. It should be remembered that, on these extremities, there debouch the two adjacent notches from each side of the cavity itself.

The cavity side detaches from the edge found at the tread surface that is inclined at an angle d (which can also be diverse, but within the previously defined limits), that is equal to the angle c. At a certain point, this inclination is sharply interrupted and the depth of the cavity attains its maximum value, which is maintained for the entire longitudinal development of the cavity, till it encounters, in a symmetrical opposed position with respect to the plane IV—IV, the sudden variation in depth associated to the inclination of the opposite side.

Said sudden increase in depth, corresponds to the height of the drop-shaped portion, i.e. to the radially inner portion of the notch.

Substantially speaking, we note that the above-said notch does not stop at the extremity of the cavity, but continues axially, towards the inside of the same said notch, inside to the profile of the side, till debouching into the said cavity after having traversed, at a base level, about 25% of the longitudinal development, measured on the surface. This particular tendency of the notch to debouch into the cavity, gives rise to the above-said continuous variability of the base-profile, which is quite easy to note when comparing the sections shown in FIGS. 3 and 4.

Moreover, FIG. 6 shows a perspective view of a portion corresponding to a quarter of the cavity, i.e. that portion comprised between one extremity of the cavity and plane IV—IV of the mid-plane, orthogonal to the axis, in the longitudinal direction, and between the axial plane V—V and the mid-plane of the rib, in the transversal direction.

For having a better clarification, in this figure the angle b between the cavity-axis and the notch-axis is equal to 180°, so much so that the zig-zag lay-out results as being eliminated, i.e. the notch now penetrates perpendicularly, into the cavity.

The figure does not require any particular explanation, nor the aid of numerical references since it is per se evident. In any case, it shows, with special clarity and especially combined with FIG. 1, the above-said variability of the base-profile of the cavity.

The tread-pattern of the invention has proved to have bestowed excellent road-behaviour qualities to the tire.

In the first place, it has shown to have a high yield in the mileage it covers owing, almost certainly, to its massive configuration, as created by the reciprocal disposition of the cavities and sipes. So that, the ratio between the surface of the solid tread (on the groung contact-area) and the surface of said ground-contact area, is comprised (in a new tread) between 80% and 90%.

On the basis of experience, one might be inclined to believe that such a solid configuration would negatively influence the 'aquaplane' characteristics of the tread, whereas instead, the tire of the invention has shown to have an even better behaviour, under this profile.

It is probable that the liquid film found between the surface of the road and that of the block, becomes completely sucked into the large cavity of the tread-pattern from where it is discharged through the circulation inside the tread, i.e. "below the level of the tread surface", with thus guaranteeing that the surface of the blocks always remains in contact with the road. In fact, the characteristic pattern of the cavities, keeps constant the full-empty ratio value, at the bottom of the cavity, with passing from the simply inflated state of the tire to the state of the tire that is inflated as well as under load and hence, squeezed in the contact area. This particularity confers to the tire, even under wet road conditions, the very same optimum road-holding qualities as had on dry roads.

Even the rapid and efficient evacuation of the water from the cavities is favoured by the particular form itself of the above-said cavities. In fact, this form forces this water to gather at the cavity-base, after which the pressure of the squeezing, acting upon the tire, presses the water into the canals inside the notches with, in this way, carrying out the removal of the water from the ground-contact area.

A further advantage had with this form of cavity, is due to the fact of its efficiently obstaculating any retention of pebbles and/or other objects that could eventually enter into the cavities, during vehicle exercise.

Moreover, the invention tread has proved to have excellent road-holding qualities also on snow-covered ground and the Applicant again holds that said result depends upon the particular form of the cavity. In fact, since the 'snow-against-snow' friction, is greater than the 'rubber-against-snow' friction, it is quite probable that, when these cavities are filled-up with compressed snow, they would originate a tread-surface having many and large zones having a greater friction with the snow, just like a spiked tire with large cross-section spikes, with thus generating the optimum road-holding qualities demonstracted by the tire.

In fact, the snow which is pressed into the cavity cannot be ejected from the same whenever the tread-zone leaves the ground-contact area, since it results as being compactly held back in the cavity by that portion of snow which, in the meanwhile, has been pressed inside the drop-shape of the notch, and which now functions as a restraining post for the snow blocked inside the cavity.

What is more, the tire has proved not to be sensible to the phenomenon of any irregular wearing-out (that generally starts at the ribs' edges) and this probably, is a result of the uniform distribution of the pressures and of the consequent wearing-out process, under the ground-contact area, owing to the fact that the sipes compensate the blocks' dimensional variation with limiting them to just slipping, under the ground-contact area and, in particular, before entering into the same.

To end with, the tread-pattern of the invention denotes an unforeseeable, low rolling-resistance, along with a non-negligible lesser noise.

The Applicant holds that these results are again the combined effect of the solid configurations of the tread-pattern as well as of the cavities that are connected to one another by notches of opportune cross-section and corresponding sipes. The global effect of these characteristics would be that of realizing a resting-surface for the tire on the road, characterized by large blocks having a high full-emply ratio value, and hence, with a low specific pressures and a small deformability.

To end with, it is intended here that, the present description has been made solely by way of non-limiting example, in particular, as regards the values of width, length, angles and reciprocal ratios for the dimensioning of the circumferential grooves in the tread-pattern of the invention. So that, what are obviously comprised in the present invention, are also all those modifications and variations, although not expressly described, that are however, easily deduced from the present inventive idea by one skilled in the art.

What is claimed is:

1. Tire for vehicle wheels, which comprises a radial carcass, a tread-band disposed in the crown zone of said carcass and a belt-structure inserted in-between carcass and tread-band, said tread-band provided with a pattern comprised by a plurality of circumferential zig-zag grooves comprising, at the surface of the tread-band, an alternated succession of narrow notches and large cavities, of a substantially elliptical form with the greater axis that is disposed in a substantially longitudinal direction, connected at each extremity, with the axis of the adjacent notch, with the notches belonging to two grooves disposed side-by-side, being circumferentially spaced apart from one another, characterized by the fact that at least the axially inner ribs, generated by said plurality of grooves, are further subdivided into blocks by a series of transversal sipes which connect each cavity with an adjacent notch, and that said cavities have a continuously variable base-profile, and that the radially lower portion of the said notches extend till the sides of said cavities in such a way as to determine the said variation of the base-profile.

2. Tire, according to claim 1, characterized by the fact that said transversal sipes have a zig-zag lay-out such as to generate a joint in the transversal direction, between two successive blocks.

3. Tire, according to claim 1, characterized by the fact that the depth of said sipes is at least equal to 30% of the maximum depth of the said cavities.

4. Tire, according to claim 1, characterized by the fact that the width of said sipes does not exceed 2 mm.

5. Tire, according to claim 1, characterized by the fact that the maximum depth of said cavity, is equal to the depth of said notches.

6. Tire, according to claim 1, characterized by the fact that said notches have their cross-section comprising a radially outer portion, with substantially radial sides, a constant width, and a radially inner portion, larger than the external portion, of a substantially ovoid form, the radial height of the radially outer portion being at least equal to 30% of the total depth of said notch.

7. Tire, according to claim 6, characterized by the fact that, on the surface, the width of said notches is comprised between 25% and 60% of the maximum width of the corresponding radially inner portion.

8. Tire, according to claim 1, characterized by the fact that the cross-section of said cavities is V-shaped, in correspondence of the central zone.

9. Tire, according to claim 1, characterized by the fact that, at the edges of said cavities, the cavity sides have an inclination comprised between 15° and 40° with respect to the radial direction.

10. Tire, according to claim 1, characterized by the fact that said circumferential grooves are of an equal number.

* * * * *